US005083245A

United States Patent [19]

Fray et al.

[11] Patent Number: 5,083,245

[45] Date of Patent: Jan. 21, 1992

[54] LAMP ASSEMBLY

[75] Inventors: William S. Fray; David E. Ballinger, both of Walsall, England

[73] Assignee: Carello Lighting plc, England

[21] Appl. No.: 621,254

[22] Filed: Nov. 29, 1990

[30] Foreign Application Priority Data

Dec. 9, 1989 [GB] United Kingdom ................ 8927903

[51] Int. Cl.[5] ................ B60Q 1/03

[52] U.S. Cl. ................ 362/61; 362/328; 362/336; 362/339

[58] Field of Search ................ 362/61, 326, 328, 337, 362/338, 339, 80

[56] References Cited

U.S. PATENT DOCUMENTS

| | | | |
|---|---|---|---|
| 1,788,937 | 1/1931 | Wood | 362/337 |
| 4,261,031 | 4/1981 | Fratty | 362/336 |
| 4,517,630 | 5/1985 | Dieffenbach et al. | 362/328 |
| 4,754,374 | 6/1988 | Collot | 362/61 |
| 4,823,246 | 4/1989 | Dilonya | 362/328 |

FOREIGN PATENT DOCUMENTS

| | | | |
|---|---|---|---|
| 3620789 | 12/1987 | Fed. Rep. of Germany | 362/61 |

*Primary Examiner*—Ira S. Lazarus
*Assistant Examiner*—Sue Hagarman
*Attorney, Agent, or Firm*—Andrus, Sceales, Starke & Sawall

[57] ABSTRACT

A vehicle headlamp assembly for producing a passing beam pattern has a paraboloidal or divergent ellipsoidal reflector with a focus. A bulb filament is disposed completely behind the focus and has no light shield interposed between the filament and the reflector so that a divergent light beam is reflected off the reflector. A lens element has prism portions (A to C) which refract light passing therethrough downwardly to produce the required light beam pattern .

9 Claims, 4 Drawing Sheets

LAMP ASSEMBLY

Figure 1:
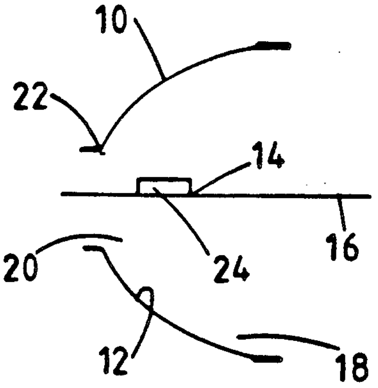

This invention relates to a lamp assembly and is particularly concerned with a vehicle headlamp or fog lamp assembly.

In vehicle headlamp assemblies, it is common practice to provide a paraboloidal reflector and to mount a light bulb so that the filament which produces the dipped or passing beam is disposed in front of the focal point of the paraboloidal reflector. This produces a convergent beam pattern upon reflection from the reflector surface. Within the bulb, there is provided a filament shield which is disposed below the filament and which intercepts light from the filament, thus preventing light reflection off most of the lower part of the reflector. Because of the positioning of the filament in front of the focus, it is to be appreciated that inversion of the beam pattern takes place and so, were it not for the provision of such a shield, light would be reflected upwardly from the lower part of the reflector, thereby causing dazzle to drivers travelling in the opposite direction. It will be appreciated that the provision of the filament shield reduces the overall efficiency of the lamp since some of the light emanating from the filament is effectively lost. Measures to improve the efficiency have been previously proposed wherein complex reflector shapes are provided with different portions of the reflector having different focal lengths. However, in such reflectors, it is usual to arrange for the various reflector portions to be so mutually positioned that their foci are substantially coincident and for the dipped or passing beam filament to be disposed in front of the coincident foci. Such complex reflector shapes have to be moulded very accurately and involve the provision of stepped regions between the various reflector portions. Such stepped regions can produce undesirable reflections, particularly when the reflector surface is coated with lacquer, as is usually the case in order to protect the reflective film.

A further disadvantage of such a lamp arrangement is that the filament itself has to be supported in some way within the bulb, and the support which is adjacent to the focus can produce images which project above a line where a sharp cut-off to the beam is required with the result that it can be difficult to satisfy the relevant lighting regulations for passing beam patterns.

Additionally, with vehicle headlamp assemblies, it is necessary to make provision for the use of different bulbs having different designs of filament shield depending upon the lighting regulations in the country in which the lamp assembly is destined to be used. This depends, inter alia, upon the side of the road on which vehicles are required to drive. Additionally, a different design of bulb is required for vehicle fog lamp or spot lamps.

It is an object of the present invention to provide a novel lamp assembly in which the above disadvantages are obviated or mitigated.

According to one aspect of the invention, there is provided a lamp assembly comprising a reflector having a focus, means for supporting a light source at a predetermined position relative to said focus, and a transparent lens element positioned so that reflected light from the light source passes therethrough, wherein said supporting means is adapted to support the light source behind the focus, there is no shielding between the light source and the reflector surface in use, and wherein the transparent lens element has one or more prisms thereon which are adapted to re-direct upwardly reflected light from an upper part of the reflector surface downwardly In one embodiment, the transparent lens element has one or more prisms thereon arranged to provide a beam pattern having an asymmetric cut-off in accordance with the relevant ECE Lighting Regulations for passing beam headlamps. Such an asymmetric cut-off has a horizontal cut-off portion and an upwardly inclined cut-off portion extending therefrom so as to define a centre kink point. This centre kink point is used for beam aiming purposes and is accurately defined because the positioning of the whole of the light source behind the focus produces a divergent beam which eliminates breakthrough above the cut-off around the centre kink point.

In another embodiment, the transparent lens element has one or more prisms thereon to modify the beam pattern so as to comply with US SAE regulations for dipped beam headlamps.

In a further embodiment, the lamp assembly has a transparent lens element having one or more prisms thereon to produce a fog lamp beam.

It will be appreciated that all of the above uses for the lamp assembly can be achieved using a common reflector and light source assembly merely by changing the design of the transparent lens element. In the case of the transparent lens element for ECE Regulations, the headlamp can be modified depending upon the rule of the road for the country concerned, merely by lateral inversion of a single design of transparent lens element. With the ECE Regulations, it will be appreciated that the side of the horizontal cut-off portion from which the upwardly inclined cut-off portion extends depends upon the rule of the road of the country concerned. As is conventional practice in the field of automobile lamps, the lens element may define the front cover of the lamp assembly, and in which case it is convenient for the lens/prisms thereon to be provided on the inner surface of the front cover so as to leave the outer surface smooth and easy to keep clean. However, it is within the scope of the invention for the lens element to be provided as a separate part behind the front cover. In some cases this is desirable, for example where automobile design dictates the use of a front cover which is inclined at a relatively large angle to the vertical, and it is also desirable for ECE passing beam headlamps where the rule of the road dictates that the lens element is orientated so the lenses/prisms are on the outer face thereof.

Because the whole of the light source lies behind the focus of the reflector, a divergent beam pattern is produced which spreads the reflected light relatively evenly over the whole of the surface area of the transparent lens element, thereby avoiding undue heating of any particular portion of the transparent lens element. Thus, it is possible for the transparent lens element to be moulded accurately out of plastics material rather than having to be formed of a more heat-resistant material such as glass which is notoriously difficult to mould accurately. Thus, such a lens element enables a sharp cut-off beam to be provided without the use of a shield interposed between the light source and the reflector.

Furthermore, the positioning of the whole of the light source behind the focus means that legs (which also generate light) used to support the light source are disposed in a position which can be better accommodated for by the design of the optics of the transparent lens element used in the present invention compared with transparent lens elements used in the prior art constructions where it is designed to cope only with images emanating forwardly of the focus and where it is inevitable for the support legs to extend behind the focus because of the manner in which the light source is carried in the lamp.

The light source usually takes the form of a filament mounted on support legs within a glass envelope forming an electric light bulb which may be of the quartz halogen type and which is removably mounted in a bulb holder of the lamp assembly. Alternatively, the light source made be provided by a so-called sealed beam filament wherein the filament without a glass envelope is mounted on support legs directly within the reflector which is hermetically sealed after being filled with a gas such as nitrogen to prevent oxidation of the filament in service.

In a lamp assembly according to the present invention which is destined to be used as a passing or dipped beam headlamp, it is preferred for regions of the transparent lens element which are above the horizontal median plane of the lamp to refract light rays passing therethrough downwardly, the amount of refraction increasing progressively upwardly away from the horizontal median plane.

The present invention also resides in a lamp assembly including said light source mounted behind the focus and without a shield which prevents light from being incident upon the lower portion of the reflector. However, the light source will be provided with the usual so-called up-light shield which prevents unreflected light from passing out of the lamp through the transparent lens element.

The reflector may be of paraboloidal shape, or may be of a more complex form, such as the shape produced by rotation of a region of that portion of an ellipse which is adjacent the inner focal point and which lies between but is spaced from the major and minor axes of the ellipse, said rotation being about an axis which intersects the ellipse between said region and the major axis of the ellipse and which passes through said inner focal point (hereinafter such a reflector will simply be referred to as a "divergent ellipsoidal reflector"). It will be appreciated from the above that the divergent ellipsoidal reflector has a single inner focal point and an infinite number of outer focal points disposed on a circle at the outer focal plane. With the light source placed immediately behind the inner focal point of the divergent elliptical reflector, light rays from the light source which have been reflected off the reflector surface are divergent. The angle between said major axis of the ellipse and the axis of rotation of said region may be up to about 1 degree and is usually about ½ degree. The focal length of the ellipse may be such that the outer focal points lie at 25 meters from the lens element so that reflected light is focused in a plane in which the necessary photometric measurements are taken in accordance with ECE Regulations for passing beam headlamp patterns. For lamps required to comply with other Lighting Regulations, the focal length of the ellipse is chosen so that the outer focal points lie at a distance from the lens element which is appropriate to such Regulations.

It is also within the scope of the invention for the lamp assembly to have more than one reflector and associated light source of the above defined type so that each reflector and associated light source provides a respective contribution to the overall beam pattern required to be produced by the lamp assembly. Such a design is considered to be advantageous in situations where the design of the automobile to be fitted with the lamp assembly does not easily permit the required beam pattern to be provided by a single reflector and light source.

Figure 2:
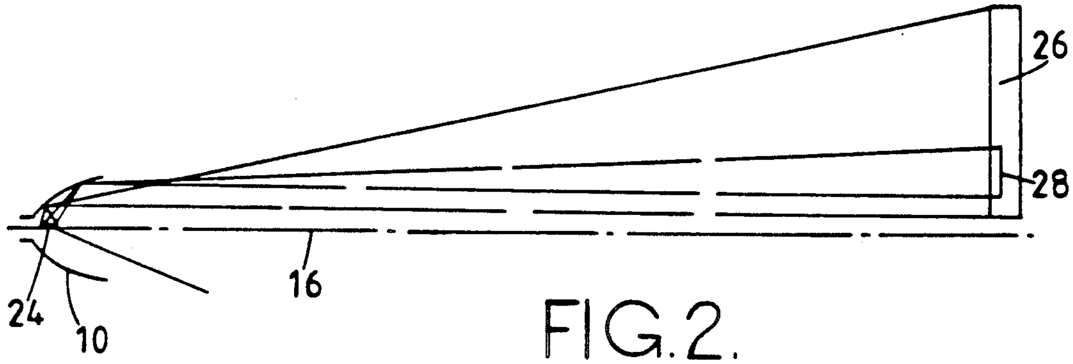
Figure 3:
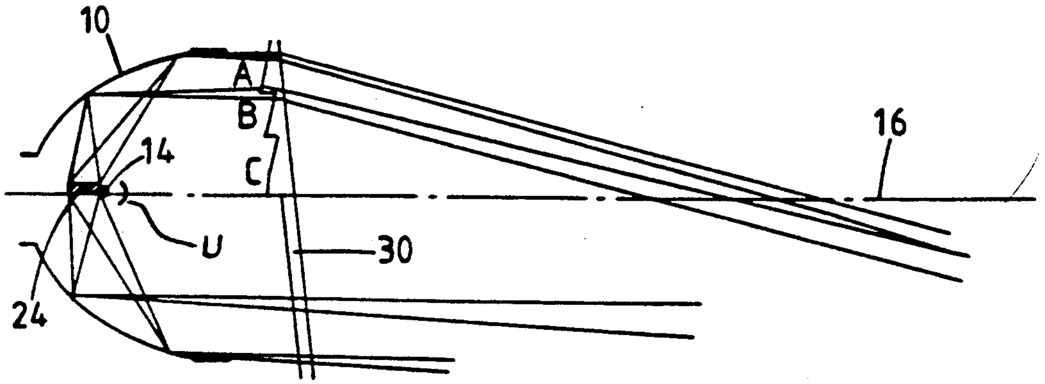
Figure 4:
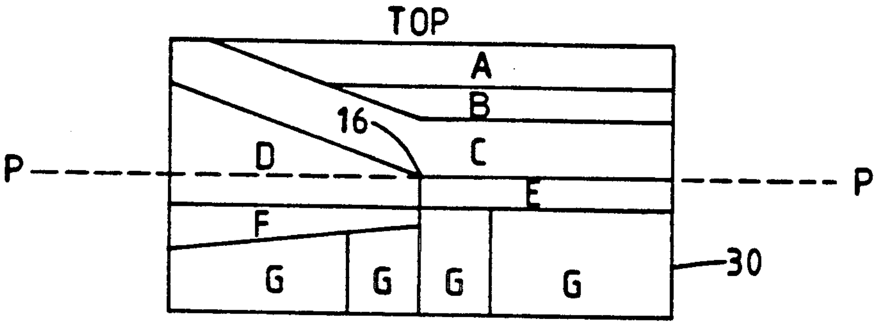
Figure 5:
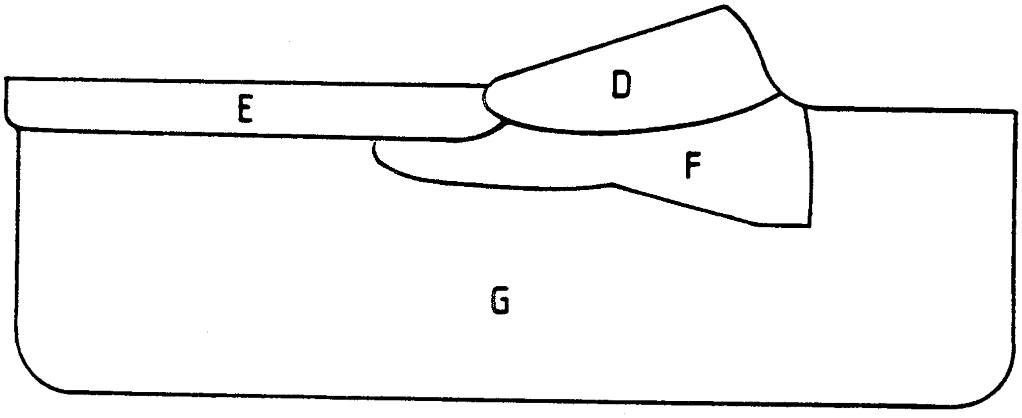
Figure 6:
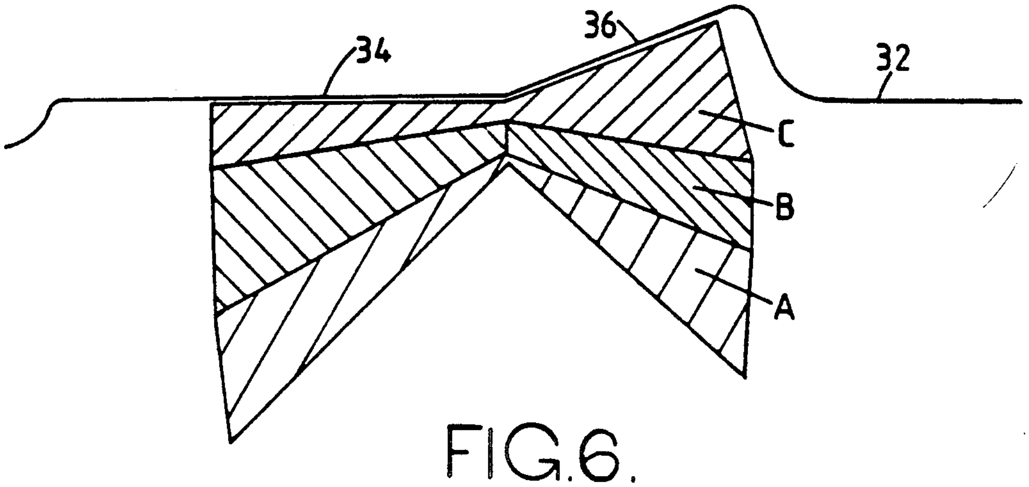
Figure 7:
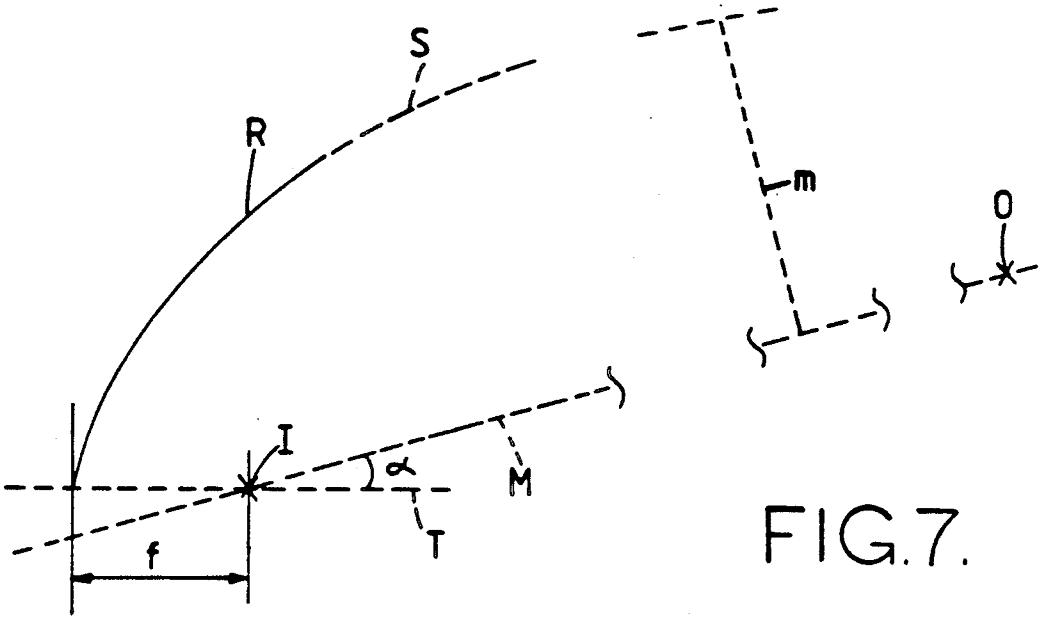
Figure 8:
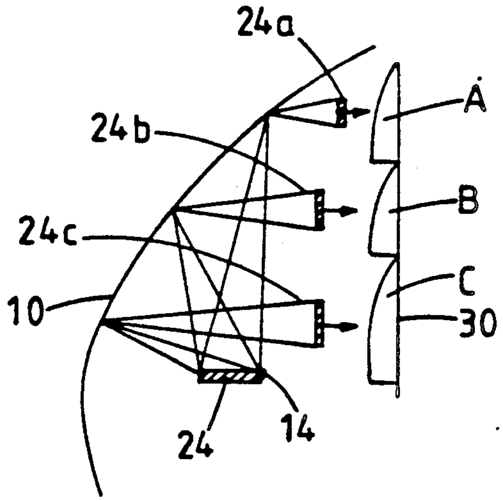
Figure 9:
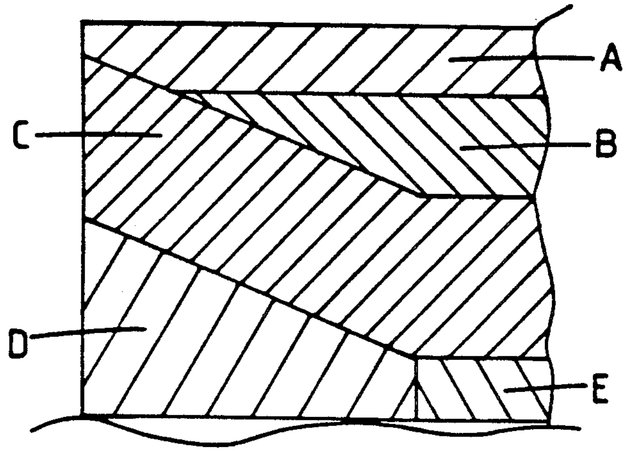
Figure 10:
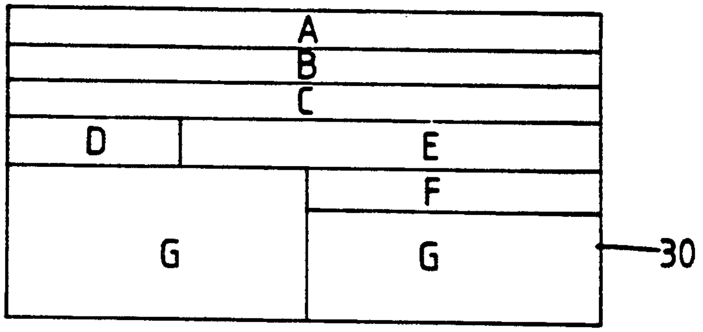
Figure 11:
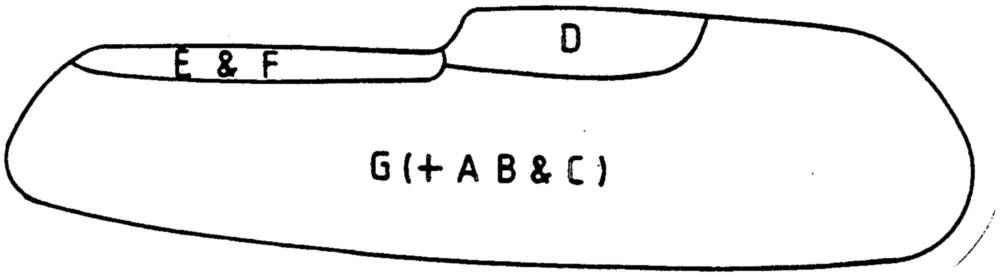

The invention will now be described in further detail with reference to the accompanying drawings, in which:

FIG. 1 is a schematic vertical axial view illustrating the positioning of a lamp filament in a reflector of a lamp assembly according to the present invention, FIG. 2 is a schematic illustration showing the arrangement of radial images of the filament, FIG. 3 is a schematic view showing the effect produced by the provision of a transparent lens element forming part of the lamp assembly, FIG. 4 is a front view of the lens element illustrated in FIG. 3, FIG. 5 is a schematic illustration showing the general distribution of light from the bottom half of the reflector after passage through the bottom half of the lens element, FIG. 6 is a view similar to FIG. 5 showing the general downward deviation and distribution of light from the top of the reflector after passage through the top part of the transparent lens element, FIG. 7 is a schematic view showing the construction of a divergent ellipsoidal reflector, FIG. 8 is a schematic view showing part of a passing beam headlamp assembly similar to that of FIGS. 1 to 6, but utilising the divergent ellipsoidal reflector of FIG. 7, FIG. 9 is a schematic front view of part of the lens element used in the lamp assembly of FIG. 8, FIG. 10 is a schematic view of another form of lens element for use with the reflector of FIG. 7 to produce a light beam pattern in accordance with the relevant US SAE Vehicle Lighting Regulations, and FIG. 11 is a schematic view showing the contributions to the final beam pattern by various parts of the beam passing through the lens element of FIG. 10

Referring now to FIGS. 1 to 3 of the drawings, the lamp assembly illustrated therein is a motor vehicle lamp assembly which is adapted to produce a beam pattern which satisfies the relevant ECE Regulations in those countries where motor vehicles are driven on the right hand side of the road. The lamp assembly comprises a dished reflector body 10 formed of an injection moulded thermosetting plastics material. The body 10 has an internal paraboloidal reflective surface 12 with its focus disposed at 14 and its optical axis 16 arranged in the horizontal median plane of the body 10. The body 10 has a front opening 18 and a central rear aperture 20 surrounded by a rearwardly extending bulb-receiving sleeve 22. The sleeve 22 is adapted to mount a bulb having a filament 24 so that the latter is disposed with its axis parallel to the optical axis 16 and with its forward end lying on the focal point 14. As can be seen from FIG. 1, the bottom of the filament 24 touches the optical axis 16. The sleeve 22 forms part of a bulb holder, and a bulb-retaining clip (not shown) is provided in a manner known per se to hold the bulb in position so that a flange (not shown) thereof engages against an internal flange (also not shown) in the sleeve 22. In accordance with usual practice, the bulb is provided with an up-light shield U which is limited in its extent necessary to ensure that unreflected light from the filament 24 cannot pass through the front opening 18. However, in contrast to conventional headlamp bulbs, the bulb is not provided with any shield which lies under the filament 24. The result of this is that light from the filament 24 is not prevented from being incident upon the lower portion of the reflective surface 12. By "lower" portion is meant that portion which lies below the horizontal median plane of the body 10.

Light from the filament 24 which is incident upon the paraboloidal reflective surface 12, passes through the front opening 18 and produces a divergent, circular beam of light wherein the filament images are radially disposed. In FIG. 2, there is typically shown a large filament image 26 which is produced by reflection off a portion of the reflective surface 12 which lies close to the filament 24, and a small filament image 28 which is produced by reflection off a portion of the reflective surface 12 which is adjacent the front opening 18, i.e. relatively remote from the filament 24. All of these filament images 26 and 28 are radial images, as will be apparent from FIG. 2.

Referring now to FIG. 3, the lamp assembly further includes a transparent lens element 30 which is spaced in front of the front opening 18 of the reflector body 10 so as to intercept reflected light from the surface 12 which has passed through the front opening 18. In this embodiment, the lens element 30 forms a transparent front cover to the headlamp assembly and is bonded to a headlamp housing (not shown) in which the reflector body 10 is adjustably mounted for beam-aiming purposes, in a manner known per se. The transparent lens element 30 is preferably moulded out of a suitably transparent synthetic resin material, e.g. a polycarbonate resin. In an alternative embodiment (not shown), the lens element 30 is provided as a separate item mounted within the headlamp housing which is closed by a separate glass cover.

The transparent lens element 30 is shown in greater detail in FIG. 4. FIG. 4 shows the element 30 in the form of a rectangular plate. In practice, the vertical side edges of the element 30 (as viewed in FIG. 4) will be curved to correspond to the curvature of the front opening 18 which, again in known manner, has a generally rectangular shape with curved lateral edges. The lens element 30 has portions A to G. All of the portions A to C lie above the horizontal median plane of the body, such plane being shown by dotted line P—P in FIG. 4. As viewed from the front of the lamp assembly, portion A lies above portion B which in turn lies above most of portion C. Portions A and B and that part of portion C which lies to the right of the vertical plane containing the optical axis 16 are horizontally disposed. The region of portion C which lies to the left of said vertical plane is inclined upwardly at an angle of about 15°. Portions A, B and C are prismatic portions which are arranged to refract light passing therethrough downwardly. The amount of refraction increases progressively upwardly away from horizontal median plane P—P. Thus, portion A refracts light through a greater angle than portion B which in turn refracts light through a greater angle than portion C. The result of this is that light which passes through portions A, B and C is refracted downwardly below the horizontal median plane of the reflector. The resultant beam pattern produced by the portions A, B and C is as illustrated in FIG. 6 where it will be seen that the part of the beam which has passed through portion C, lies just below the critical upper cut-off 32 of the beam pattern, whilst the parts of the beam which are passed through portions B and A lie below this. The particular shape of these parts of the beam pattern is as a result of a slight horizontal spreading effect produced by curving the prism portions A and B in the horizontal direction, taken in conjunction with the changing radial orientation of the filament images 26 and 28 which occurs circumferentially of the beam pattern. The prism portion C has virtually no horizontal curvature and therefore produces no horizontal spread. The upper cut-off 32 of the beam pattern has a horizontal region 34 and an upwardly inclined region 36 extending from one end of the region 34. Such regions 34 and 36 form an essential part of the required beam pattern in accordance with the relevant ECE Regulations.

Referring once again to FIG. 4, the lens element 30 has a horizontally disposed region E which extends horizontally and which is virtually plain, i.e. it has virtually no prismatic and very little horizontal spreading effects. The portion of the final beam pattern resulting from passage of light through portion E is illustrated by correspondingly referenced portion E in FIG. 5. It will be seen that this region defines the important horizontal region 34. As can be seen in FIG. 4, portion E lies with its upper edge on the horizontal median plane P—P. The portion E terminates at the vertical median plane of the reflector. Portion D of the lens element 30 has its lower edge aligned with that of portion E whilst its upper edge is inclined upwardly and to the left away from the optical axis 16 at an angle of about 16° to the horizontal. Like the portion E, the portion D is virtually plain and defines the upwardly inclined region 36 and the important part of the beam pattern just below region 36.

Portion F of lens element 30 is provided to the left of the vertical median plane of the reflector body below the portion D and is also virtually plain. The lower edge of portion F is inclined downwardly to the left away from the vertical median plane at an angle of about 10° to the horizontal. This region produces region F of the final beam pattern (see FIG. 5).

The regions G are provided with horizontally curved lensing thereon to effect horizontal spreading of the beam pattern.

The total combined beam pattern which is produced is a combination of the beam patterns illustrated in FIGS. 5 and 6. It is to be appreciated that the beam patterns illustrated in FIGS. 5 and 6 are those which exist at 25 meters from the lamp as viewed looking forwardly along the beam, such distance being that at which the light flux measurements are made in order to check whether a beam pattern satisfies the requirements under the ECE Regulations.

Referring now to FIG. 7 of the drawings, a divergent ellipsoidal reflector shape is produced by rotation of a region R of that portion of an ellipse S (only partly shown) having an inner focal point I, an outer focal point 0, a major axis M and a minor axis m The region R is adjacent the inner focal point I and lies between but is spaced from the major and minor axes M and m, respectively, of the ellipse S. Such rotation takes place about an axis T which intersects the ellipse S between said region R and the major axis M of the ellipse and which passes through said inner focal point I.

The angle $\alpha$ between the major axis M of the ellipse and the axis of rotation T of the region R in this embodiment is ½ degree. The inner focal length f of the ellipse is 29-32 mm whilst the outer focal length of the ellipse S is such that the outer focal point 0 lies at 25 meters from the lens element in the completed lamp assembly. It will be appreciated from the above that the resultant divergent ellipsoidal reflector 10 (see FIG. 8) has a single inner focal point 14 and an infinite number of outer focal points (not shown in FIG. 7) disposed on a circle at the outer focal plane.

FIG. 8 also shows typical filament images 24*a*, 24*b* and 24*c* produced by filament 24 when positioned immediately behind the inner focal point 14 upon reflection off the reflector 10. The typical filament images 24*a* to 24*c* pass through the respective portions A to C of the lens element 30 and, together with other filament images which pass through other portions of the lens element 30, produce an asymmetric beam pattern similar to that illustrated in FIGS. 5 and 6. In this embodiment, the portions A,B and C have progressive prisms arranged to refract the light rays downwardly by $\frac{1}{2}^\circ+(\frac{1}{2}^\circ$ to $3\frac{1}{2}^\circ)$ for region A, $\kappa^\circ+(2\frac{1}{2}$ to $5\frac{1}{2})$ for region B and $\frac{1}{2}^\circ+(4\frac{1}{2}^\circ$ to $7^\circ)$ for region C. The other regions of the lens element 30 of FIGS. 8 and 9 are similar to the regions D to G of the lens element of FIG. 4.

Referring now to FIGS. 10 and 11, the lens element 30 illustrated therein is for use with the divergent ellipsoidal reflector 10 described hereinabove in relation to FIGS. 7 and 8. In this embodiment, the portions A to C of the lens element 30 are formed of combined prisms and lenses which refract light rays downwardly and spread them horizontally so as to coincide with the light which has passed through the regions G which contain lensing merely to spread the light horizontally. The region D is weakly lensed to concentrate the light slightly in the centre of the beam. Region E refracts light passing therethrough slightly downwardly so as to coincide with light passing through region F which is lensed so as to spread the light slightly. Regions A to E are disposed above the horizontal median plane of the reflector 10 wherein the axis T (see FIG. 7) lies. The light beam pattern illustrated in FIG. 11 is intended to comply with the relevant US SAE Lighting Regulations for dipped beam automobile headlamps.

We claim:

1. A lamp assembly comprising a reflector having a focus, means for supporting a light source at a predetermined position relative to said focus, and a transparent lens element positioned so that reflected light from the light source passes therethrough, said supporting means being adapted to support the light source behind said focus without shielding between the light source and said reflector in use, and said transparent lens elements having one or more prisms thereon which are adapted to re-direct reflected light from an upper part of the reflector downwardly.

2. The lamp assembly as claimed in claim 1, wherein said transparent lens elements has prisms thereon arranged to provide a beam pattern having an asymmetric cut-off for passing beam headlamps.

3. The lamp assembly as claimed in claim 2, wherein the prisms of said transparent lens element which are above the horizontal median plane of the lamp are arranged to refract light rays passing therethrough downwardly, the amount of refraction increasing progressively upwardly away from the horizontal median plane.

4. The lamp assembly as claimed in claim 1, wherein said transparent lens element has prisms thereon to modify the beam pattern for dipped beam headlamps.

5. The lamp assembly as claimed in claim 4, wherein the prisms of said transparent lens element which are above the horizontal median plane of the lamp are arranged to refract light rays passing therethrough downwardly, the amount of refraction increasing progressively upwardly away from the horizontal median plane.

6. The lamp assembly as claimed in claim 1 comprising an automobile fog lamp assembly.

7. The lamp assembly as claimed in claim 1, wherein said reflector is paraboloidal.

8. The lamp assembly as claimed in claim 1, wherein said reflector has a shape produced by rotation of a region of a portion of an ellipse having inner and outer focal points and major and minor axes, said portion being adjacent the inner focal point and which lies between but is spaced from he major and minor axes of the ellipse, and said rotation being about an axis which intersects the ellipse between said region and the major axis of the ellipse and which passes through said inner focal point.

9. The lamp assembly as claimed in claim 1, including said light source which is mounted behind the focus and in a manner which allows light from said source to be incident upon the lower portion of the reflector, said light source including an uplight shield which prevents unreflected light from passing directly out of the lamp assembly through the transparent lens element.

* * * * *